Patented Nov. 8, 1932

1,886,379

UNITED STATES PATENT OFFICE

HENRI MARTINUS DE LANGE, OF DE BILT, NETHERLANDS, ASSIGNOR TO JOHN FILLANS BARR, OF DROGHEDA, IRISH FREE STATE, AND DIRK DE LANGE, OF DE BILT, NETHERLANDS

PROCESS FOR THE PREPARATION OF A GLASSY DRYING SUBSTANCE FROM CEMENT WITH OR WITHOUT COLORS

No Drawing. Application filed April 11, 1931, Serial No. 529,546, and in Denmark November 15, 1930.

The invention relates to a process for the preparation of a glassy drying substance from cement with or without colors, which can be applied to walls, partitions and objects of a stony character, also to cork, pressed paper, pressed wood fibres etc., without it drying off, tearing or flaking off.

It is already known to prepare a glassy drying material from dry color, cement and water. When such a material is applied to walls or objects, the results obtained are nearly always bad, as the layer, if the material is applied thinly, dries up and loses color, whilst the layer applied comparatively thickly, of a thickness of about 1, 2 or 3 mm. sometimes dries off or after a few days tears or flakes off. The replacement of the water in mixing the cement by milk gives in certain cases, especially as regards drying off, a slight improvement, but it is not sufficient to remove the defects completely.

It has also been proposed, to use as means for mixing the cement a fluid obtained from calcium chloride, soap and water. This process however possesses the disadvantage that the soap is precipitated in insoluble condition. This precipitation shows in the finally obtained result, as it stands out, particularly with an excess of moisture in the air as a white veil. Also hair like cracks are formed when using calcium chloride and soap, as an overlarge amount of calcium chloride has to be employed, whilst if using a smaller amount of calcium chloride the effect of the cement is weakened.

In order that the layer applied should be as hard as possible, the cement is the main constituent of the mass, so that at the most 20% of color can be used, so that the color is weak and cement like.

In accordance with the present invention a material is prepared from cement with or without color, which dries with a glassy surface and as hard as stone, does not dry off when applied in a thin layer and in a thick layer does not tear. Further this material possesses the advantage that the amount of color used can be considerably increased, so that instead of 20% dry color and 80% cement, for example 60% color and 40% cement can be used.

This large amount of color has naturally a very favorable influence on the color, as the cement like character of the layer completely disappears.

The invention consists in the fact that as means for mixing the cement an emulsion is used, which is obtained from lime, soap, calcium chloride, hydrochloric acid, aluminum and water.

The emulsion can be prepared by slaking quick lime in a soap solution and mixing the dry material obtained in this manner with a solution, obtained by mixing calcium chloride, hydrochloric acid, aluminum and water.

It is clear that the invention includes the case in which instead of mixing together hydrochloric acid and aluminum, a watery aluminum-chloride solution is added at once.

The invention is made more clear by the following example. Quick lime is mixed with 50% water, in which 10% soap has been dissolved. The dry material obtained in this manner is mixed with four times its volume of a solution, obtained by mixing 45% calcium chloride, 7.5% hydrochloric acid, 46.75% water and 0.75% aluminum. This emulsion can be thinned with water, up to 10 times its volume, without the constituents separating out. This thinned or unthinned emulsion is used for the mixing of the cement mass, mixed or unmixed with colors. The thinning of the emulsion is proportioned to the amount of cement which is used. For 60% color and 40% cement the emulsion can be thinned for example with the same volume of water. For 20% color and 80% cement for instance a thinning of the emulsion with 9 times its volume of water can be effected. If the polish of the glassy layer obtained is satisfactory, it can be worked over, as desired, with wax or turpentine.

If however, the polish is too weak or too strong, it can be reduced or increased in known manner with matt, half matt, or glossy-varnish, consisting of resin or celluloid or the like.

I claim:

1. Process for the preparation of a material for mixture with cement consisting in making an emulsion of lime, soap, calcium chloride, hydrochloric acid, aluminium and water.

2. Process for the preparation of a material for mixture with cement consisting in slaking quick lime with a soap solution and mixing the dry material so obtained in a solution obtained by mixing calcium chloride, hydrochloric acid, aluminium and water.

3. Process for the preparation of a material for mixture with cement consisting in mixing quick lime with 50% water, in which 10% soap is dissolved and then mixing the dry material so obtained with 4 times its volume of a solution obtained by mixing 45% calcium chloride, 7.5% hydrochloric acid, 46.75% water and 0.75% aluminium.

4. A process for the preparation of a glassy drying substance consisting in slaking quick line with a soap solution, mixing the dry material thus obtained with a solution of calcium chloride, hydrochloric acid, water and aluminum, and mixing the emulsion thus obtained with cement and coloring matter.

5. A process for the preparation of a glassy drying substance consisting in slaking quick lime with a soap solution, mixing the dry material thus obtained with a solution of calcium chloride, hydrochloric acid, water and aluminum, thinning the emulsion thus obtained with water, and mixing the resulting thinned emulsion with cement and coloring matter.

6. A process for the preparation of a glassy drying substance consisting in slaking quick lime with a ten per cent (10%) soap solution, mixing the dry material thus obtained with a solution of calcium chloride forty-five per cent (45%), hydrochloric acid seven and five-tenths per cent (7.5%), water forty-six and seventy-five hundredths per cent (46.75%), and aluminum seventy-five hundredths per cent (.75%), thinning the emulsion thus obtained with water, and mixing the thinned emulsion with cement and coloring matter.

In testimony whereof I have hereunto set my hand this 3rd day of March, 1931.

HENRI MARTINUS DE LANGE.